Dec. 19, 1922.
J. A. RITTER.
AUTOMOBILE STORAGE BATTERY CHARGING SYSTEM.
FILED FEB. 1, 1922.
1,439,483
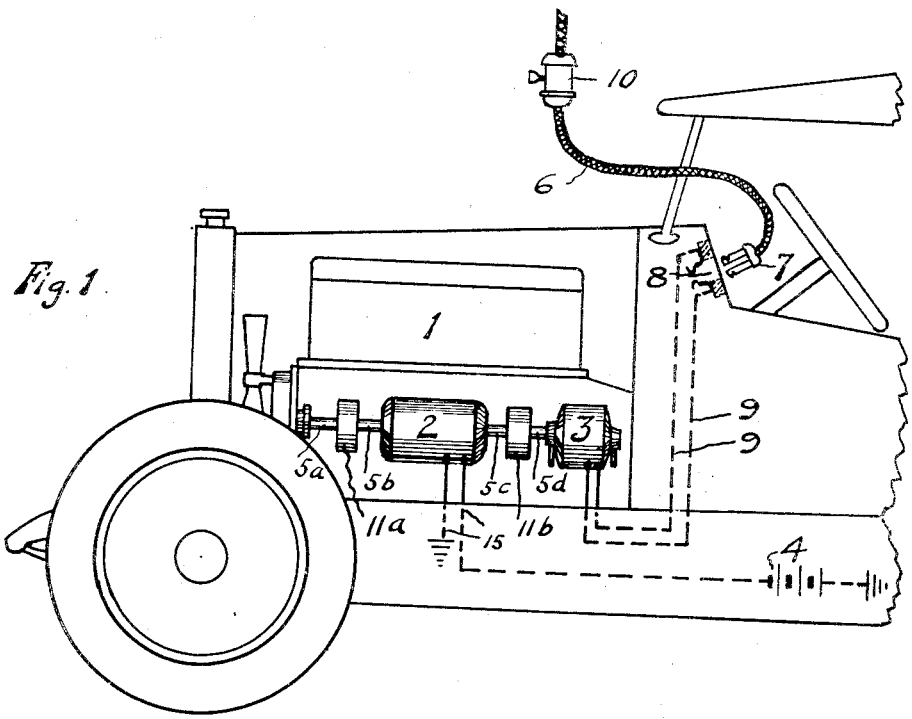
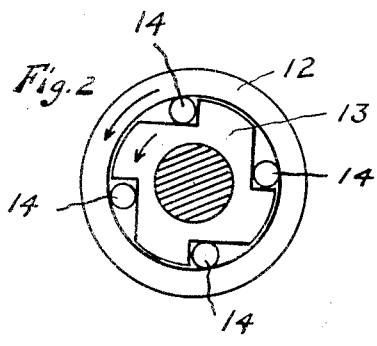
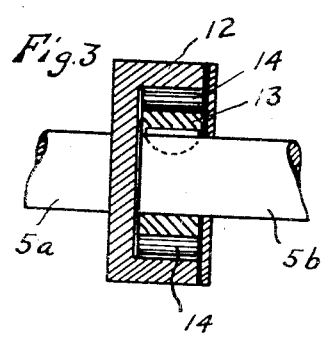
John A. Ritter
INVENTOR Patented Dec. 19, 1922.

1,439,483

UNITED STATES PATENT OFFICE.

JOHN A. RITTER, OF LANSDOWNE, PENNSYLVANIA.

AUTOMOBILE STORAGE-BATTERY-CHARGING SYSTEM.

Application filed February 1, 1922. Serial No. 533,302.

*To all whom it may concern:*

Be it known that I, JOHN A. RITTER, a citizen of the United States, residing at Lansdowne, in the county of Delaware and State of Pennsylvania, have invented certain new and useful Improvements in Automobile Storage-Battery-Charging Systems, of which the following is a specification.

An automobile driven by a steam or internal combustion engine as a prime source of power (hereinafter referred to as the "engine") is usually provided with a storage battery for various purposes, and in order that this battery may be kept in a charged condition a small electric generator is installed in such a manner as to be operative for charging the battery during the normal operation of the vehicle.

This arrangement is quite satisfactory provided the vehicle is in fairly constant use; but if, for any reason, the vehicle is used infrequently for a considerable period the battery may receive less current than it loses through local action, insulation leakage, etc., and in this event it will become so thoroughly discharged as to be entirely useless. A battery in this condition is liable to serious injury, chiefly from sulphation, and apart from reasons of convenience it is therefore desirable to keep it fully charged as much of the time as possible.

My invention relates to the charging of automobile storage batteries during the period when the engine is idle and it improves the art by providing a means for this purpose that requires no disturbance or adjustment of the existing electrical circuits on the automobile and which can be safely used by persons who possess no especial electrical knowledge.

Referring to the drawings:

Figure 1 represents an automobile equipped with the various devices and electrical circuits which embody my invention.

Figures 2 and 3 represent a preferred form of automatic overrunning clutch, the construction of which forms no part of my invention; but which I illustrate for convenience in describing my battery charging system.

Referring to the drawings in detail: 1 illustrates an automobile engine connected through a gear train with an auxiliary external shaft $5^a$, $5^b$, through which is driven an electric generator of the conventional type 2. This generator will be driven at various speeds during the normal operation of the engine 1, charging the battery 4 through the wires 15 and in order that the battery may receive a fairly uniform charging current regardless of these speed variations the generator will be equipped with certain regulating devices either inherent in the generator or external thereto. These devices are well known in the art and art not indicated in my drawings.

I make use of the conventional generator 2 together with its regulating devices for charging the battery 4 while the engine 1 is idle by connecting the said generator with an electric motor 3 by means of the shaft $5^c$, $5^d$. I prefer to wind this motor so that it may operate from an ordinary commercial source of current likely to be available in most public and private garages such as alternating current of 110 volts, 60 cycles; and which current I prefer to conduct from an ordinary lighting fixture by means of the cord 6 and cap 7 to the receptacle 8 mounted in some accessible place on the automobile.

This receptacle is permanently connected by means of the wires 9 to the motor 3 and when the cap 7 is inserted in the receptacle 8 and this circuit energized by current supplied through the switch 10 the motor will rotate and drive the generator 2.

In order that the rotation of the generator armature may be effected in this manner without driving the engine 1 through the shaft $5^b$, $5^a$, I provide a clutch $11^a$ between the generator and the engine and in order that the operation of my battery charging system may be as nearly automatic as possible I prefer to use a clutch of the automatic overrunning type.

One form of an overrunning clutch is illustrated in Figures 2 and 3 where 12 is a hardened ring attached to the shaft $5^a$, 13 is a ratchet attached to the shaft $5^b$ and 14 is a roller lying free between this ratchet and the inner surface of the ring 12. When this ring is rotated in the direction indicated by the arrow the rollers 14 will all rotate in the same direction and become firmly engaged by friction between the inner surface of the ring and the faces of the ratchet and this ratchet will tend strongly to revolve in the same direction as the ring 12 thereby driving the shaft $5^b$. When the shaft $5^b$ becomes the source of power and drives the ratchet 13 in the direction indicated by the arrow the rollers 14 will revolve in such a manner as to become disengaged from the inner surface of the ring 12 and the ratchet will therefore rotate freely without driving the ring 12 and the shaft 5ª.

It will thus be seen that when a clutch of this type is used in the shaft 5ª, 5ᵇ (Fig. 1) the engine 1 will drive the generator 2 whenever the engine is operated; but when the engine is idle the motor 3 can be used to drive the generator 2 without transmitting any power to the engine 1.

In a similar manner I install a clutch 11ᵇ between the generator 2 and the motor 3 in the shaft 5ᶜ, 5ᵇ whenever it is undesirable to drive the motor 3 during the normal operation of the engine 1. This clutch is so arranged that it transmits torque in a given direction from shaft 5ᵇ to shaft 5ᶜ; but not in the same direction from 5ᶜ to 5ᵇ. This saves unnecessary wear on the motor 3.

I prefer to make the motor 3 of such capacity that it will drive the generator 2 at approximately the same speed that the said generator attains when normally driven by the engine 1, and this speed will be determined in any given automobile by the engine speed necessary to drive the vehicle at the normal driving speed which is between 20 and 25 miles per hour. At this speed the regulating devices hereinbefore mentioned will function in a normal manner and the battery 4 will receive current at a proper rate so long as the motor 3 is in operation.

I am aware that clutches have been used between the engine and the generator in automobile storage battery charging systems in order to free the generator shaft from driving connection with the engine for the purpose of using the generator as an electric starter when desired.

My purpose in using a similar means of disengagement is to permit the generator to function in a normal manner while being driven by an electric motor energized by a source of power external to the automobile, and I claim:

1. In an automobile storage battery charging system, an electric motor energized by a source of power external to the automobile, an electric generator adapted to be driven thereby, an engine, mechanical means for driving the generator from the engine and a clutch in said means adapted to disengage the generator from the engine.

2. In an automobile storage battery charging system, an electric motor energized by a source of power external to the automobile, an electric generator adapted to be driven thereby, an engine, mechanical means for driving the generator from the engine and an overrunning clutch in said means.

3. In an automobile storage battery charging system, an electric motor energized by a source of power external to the automobile, an electric generator adapted to be driven thereby through a driving connection, a clutch in said driving connection adapted to disengage the generator from the motor, an engine, mechanical means for driving the generator from the engine and a clutch in said means adapted to disengage the generator from the engine.

4. In an automobile storage battery charging system, an electric motor energized by a source of power external to the automobile, an electric generator adapted to be driven thereby through a driving connection, an overrunning clutch in said driving connection, an engine, mechanical means for driving the generator from the engine and an overrunnning clutch in said means.

In testimony whereof I affix my signature.

JOHN A. RITTER.